(12) United States Patent
Goma et al.

(10) Patent No.: US 7,818,593 B2
(45) Date of Patent: Oct. 19, 2010

(54) POWER CONVERSATION FOR DEVICES ON A SHARED BUS USING BUS BUSY AND FREE SIGNALS

(75) Inventors: Sergiu Goma, Markham (CA); Millivoje Aleksic, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 1057 days.

(21) Appl. No.: 11/237,065

(22) Filed: Sep. 28, 2005

(65) Prior Publication Data

US 2007/0073956 A1    Mar. 29, 2007

(51) Int. Cl.
 G06F 1/00 (2006.01)
 G06F 1/32 (2006.01)
 G06F 13/00 (2006.01)

(52) U.S. Cl. ........................ 713/310; 713/300; 713/323; 710/100

(58) Field of Classification Search .................. 713/300, 713/310, 323; 710/100
See application file for complete search history.

(56) References Cited

U.S. PATENT DOCUMENTS

| | | | | |
|---|---|---|---|---|
| 5,621,250 | A | * | 4/1997 | Kim ........................... 307/10.1 |
| 5,652,895 | A | | 7/1997 | Poisner |
| 5,845,139 | A | | 12/1998 | Fischer et al. |
| 5,935,253 | A | * | 8/1999 | Conary et al. ................ 713/322 |
| 6,173,350 | B1 | | 1/2001 | Hudson et al. |
| 6,463,543 | B1 | * | 10/2002 | Alvarez ....................... 713/323 |
| 6,532,506 | B1 | * | 3/2003 | Dunstan et al. ............. 710/100 |
| 6,560,712 | B1 | * | 5/2003 | Arends et al. ................ 713/320 |
| 6,622,178 | B1 | * | 9/2003 | Burke et al. ................... 710/15 |
| 2003/0148801 | A1 | * | 8/2003 | Deyring et al. .............. 455/701 |
| 2004/0225814 | A1 | | 11/2004 | Ervin |

FOREIGN PATENT DOCUMENTS

DE    102 46 337  B3    5/2004

OTHER PUBLICATIONS

"The I²C-Bus Specification, Version 2.1," Philips Semiconductors, Jan. 2000.
International Search Report - PCT/IB06/002780, International Search Authority - European Patent Office, Apr. 10, 2007.
Written Opinion - PCT/IB06/002780, International Search Authority - European Patent Office, Apr. 10, 2007.
International Preliminary Report on Patentability - PCT/IB06/002780, The International Bureau of WIPO - Geneva, Switzerland, Apr. 1, 2008.

* cited by examiner

*Primary Examiner*—Ji H Bae

(57) ABSTRACT

A method of operating a shared bus comprises sending a wake-up signal on the shared bus. The wake-up signal comprises a sequence of signals, each signal of the sequence being one of a signal indicating the bus is free and a signal indicating the bus is busy. A microcontroller to effect this method is also contemplated. A wake-up device for a shared bus has a first latch to recognize a signal indicating one of said shared bus being free and said shared bus being busy and selectively output a recognition signal and a second latch to, after receipt of the recognition signal, recognize a signal indicating another of the shared bus being free and the shared bus being busy and selectively output a power-on signal. The latches may be D-type flip flops.

54 Claims, 4 Drawing Sheets

_US 7,818,593 B2_

POWER CONVERSATION FOR DEVICES ON A SHARED BUS USING BUS BUSY AND FREE SIGNALS

BACKGROUND

This invention relates to operation of a shared bus in a manner which may facilitate power conservation.

It is known to place a device in a power saving mode when the device is not in use. For example, in a multi-device system, idle devices may be placed in a power conservation state or "sleep" mode. When a device in sleep mode is needed, the device may be powered up to a stand-by state ("woken" up) so that it is ready for use. A simple manner of implementing a multi-device system is to link the devices with a shared bus. To wake-up a sleeping device on a shared bus, a separate "wake-up" line could be provided, This invention seeks to provide an improved manner of handling power conservation on a shared bus.

SUMMARY OF INVENTION

A method of operating a shared bus comprises sending a wake-up signal on the shared bus. The wake-up signal comprises a sequence of signals, each signal of the sequence being one of a signal indicating the bus is free and a signal indicating the bus is busy. A device to effect this method is also contemplated.

A method of operating a device on a shared bus comprising receiving a wake-up signal on said shared bus comprising a sequence of signals, each signal of said sequence being one of a signal indicating said bus is free and a signal indicating said bus is busy; and responsive to said receiving, prompting an associated device to power up to a stand-by condition. A device to effect this method is also contemplated.

A method of waking up, comprising while in a power conservation state, receiving a wake-up signal on a shared bus comprising a sequence of signals, each signal of said sequence being one of a signal indicating said bus is free and a signal indicating said bus is busy; and responsive to said receiving, power up to a stand-by state. A device to effect this method is also contemplated.

A wake-up device for a shared bus may have a first latch to recognise a signal indicating one of said shared bus being free and said shared bus being busy and selectively output a recognition signal and a second latch to, after receipt of the recognition signal, recognise a signal indicating another of the shared bus being free and the shared bus being busy and selectively output a power-on signal. The latches may be D-type flip flops.

Other features and advantages of the invention will become apparent from a review of the following description in conjunction with the drawings.

BRIEF DESCRIPTION OF THE DRAWINGS

In the figures which illustrate an example embodiment of the invention.

DETAILED DESCRIPTION

The devices of a multi-device system may communicate by a shared bus and the shared bus may accord to the I²C bus system described in the "The I²C-Bus Specification Version 2.1" issued by Philips Semiconductors in January, 2000, the contents of which are incorporated by reference herein.

The I²C bus system uses two bus conductors: a clock signal conductor (SCL) carrying a clock signal and a data signal conductor (SDA) carrying a data signal. These bus conductors, which may also be referred to as bus lines, provide a simple two wire serial bus. Each device has an address so that messages placed on the bus system may be addressed to a particular device.

The I²C bus system contemplates a master device which is responsible for generating the clock and for initiating data transfers. Hence it is typical that most data will originate from a master device. The system also contemplates the possibility of more than one device acting as a master device, provided only one device acts as a master device at any given time. A slave device is permitted to hold the clock line low in certain instances to force the master device to wait if the slave needs additional time to complete an operation, e.g., store a data byte before additional data is received. The I²C bus system allows a device to hold a bus line low by requiring wired-AND connections of all I²C interfaces to the I²C bus.

With a serial bus, data is transmitted on the bus bit-by-bit, with one bit being transmitted on the data signal conductor during each clock cycle on the clock signal conductor. A transmitted bit may have a pre-established low voltage state to represent one of a logical 0 or a logical 1 and a pre-established high voltage state to represent the other of a logical 0 or a logical 1. The clock line alternates between high and low voltage states, with one clock cycle being given by the time between when the clock line completes a transition to a low voltage state and when it next completes a transition back to the low voltage state. In accordance with the I²C bus system, a data bit voltage state must be stable (i.e., maintained either at its high or its low state) in the portion of a clock cycle during which the clock signal is high. While the clock signal is low, the data signal may transition to the state of the next data bit to be transmitted.

Figure 1:
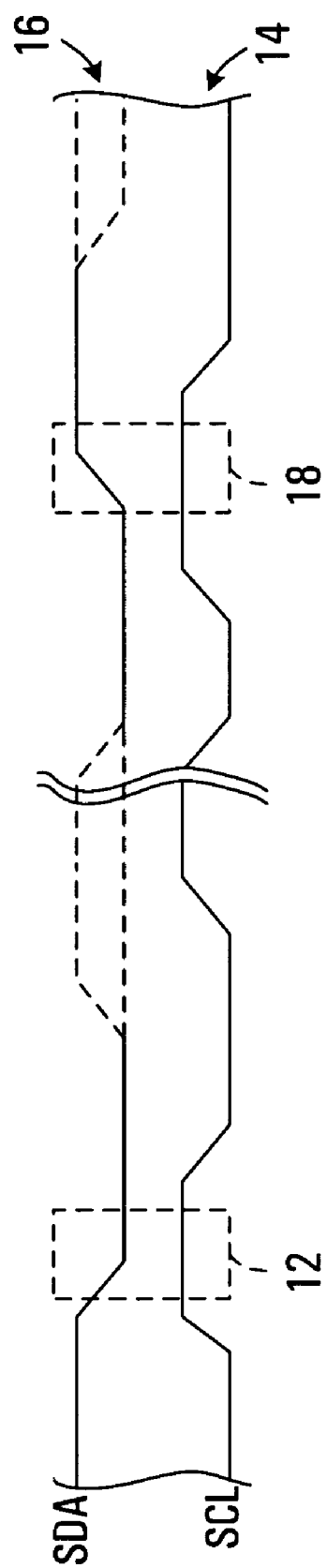
FIG. 1 is a bus signal diagram.

To allow shared use of the bus, the I²C bus system defines a START (bus busy) condition and a STOP (bus free) condition. These conditions are always generated by a master device. The bus is considered to be busy after the START condition and only considered to be free again at the end of a guard time following the STOP condition. When the bus is free, both the data and clock bus lines are in a high state. As illustrated in FIG. 1, a START condition 12 arises when the clock signal 14 is in its high state and the data signal 16 transitions from its high state to its low state. Conversely, a STOP condition 18 arises when the clock line 14 is in its high state and the data line 16 transitions from its low state to its high state. It will be apparent that the START and STOP conditions are readily distinguished from data transfer given the requirement that, to transfer a data bit, the data line remain in a stable (high or low) state during the high state of the clock.

An I²C bus system can be used with a handheld electronic device, such as a cell phone, personal data assistant (PDA) or personal information manager (PIM) in which the devices include a microcontroller and a display driver (e.g., an LCD driver), and may also include a camera. In a handheld device, the microcontroller typically acts as an I²C bus system master and the display driver as a slave. A camera could be configured to act only as a slave, or as either a master or a slave. In any event, almost all data flowing between the camera and the microcontroller is image data that passes from the camera to the microcontroller.

There is a strong impetus to minimize power consumption in a handheld electronic device in order to preserve battery life. This is particularly important for a handheld device having a camera, since a camera spends most of its time in an inactive state. In a handheld device with an I²C bus system, a slave device could be configured to go to sleep after a configurable period of idleness, or could go to sleep in response to a suitable command addressed to it from the master device. A problem arises, however, in waking up a sleeping device on the shared bus. It is not sufficient to send a data command from a master device addressed to the slave as the slave, being asleep, will not be listening for the command and so will ignore it. Adding a separate wake-up signaling line between the master and slave requires a significant hardware and software or firmware modification. Another consideration is that the slave must be awoken without negatively impacting other devices on the shared bus.

To solve these problems, each slave that must be able to be awoken (i.e., moved from a power conservation state to a stand-by state) by a master device is provided with a wake-up device placed in parallel with the data line and the clock line. The wake-up device is arranged to respond to a special sequence placed on the I²C bus system. Specifically, this wake-up device is arranged to respond to a pre-defined sequence of STOP (bus free) and START (bus busy) conditions. When this "awake" sequence is placed on the I²C bus system, any sleeping slave is awoken by its associated wake-up device.

It will be recalled that, according to the specification for the I²C bus system, only a master device can generate a START condition or a STOP condition and that these conditions are used to indicate when the bus is busy. In a handheld device, if the microcontroller is the only master device, then it is the only device permitted to generate these conditions. In such a situation, any pre-defined START and STOP sequence may be used as the wake-up signal for the other devices in the handheld and the only practical requirement is that the sequence be completed before the microcontroller enables other signals (i.e., data transfers) to occur on the bus (so that the wake-up device can be easily arranged to recognise the sequence). Where another device, such as the camera, could also be the master, it would still be expected that the microcontroller would be the device that awakens other devices. In this situation, to avoid the possibility of another master seizing the bus after a STOP condition is placed on the bus by the microcontroller, there is an additional requirement for the wake-up sequence. Specifically, a START condition must be generated after any STOP condition in the wake-up sequence before the bus is considered free (i.e., before the end of the guard time after generation of the preceding STOP condition of the wake up sequence). Where the master is generating a clock with a regular clock period, the START condition can be generated in the period after the STOP condition only if the clock period is less than the guard time. Where this is not the case, the microcontroller should generate the START condition in the same clock cycle in which the STOP condition was generated so that the START condition can follow the STOP condition in a period of time which is shorter than the guard time. Conveniently, the microcontroller could simply hold the clock line high for the duration of the wake-up sequence. The sequence used, as well as the manner it is placed on the bus system, will impact the design for the wake-up device.

Figure 2:
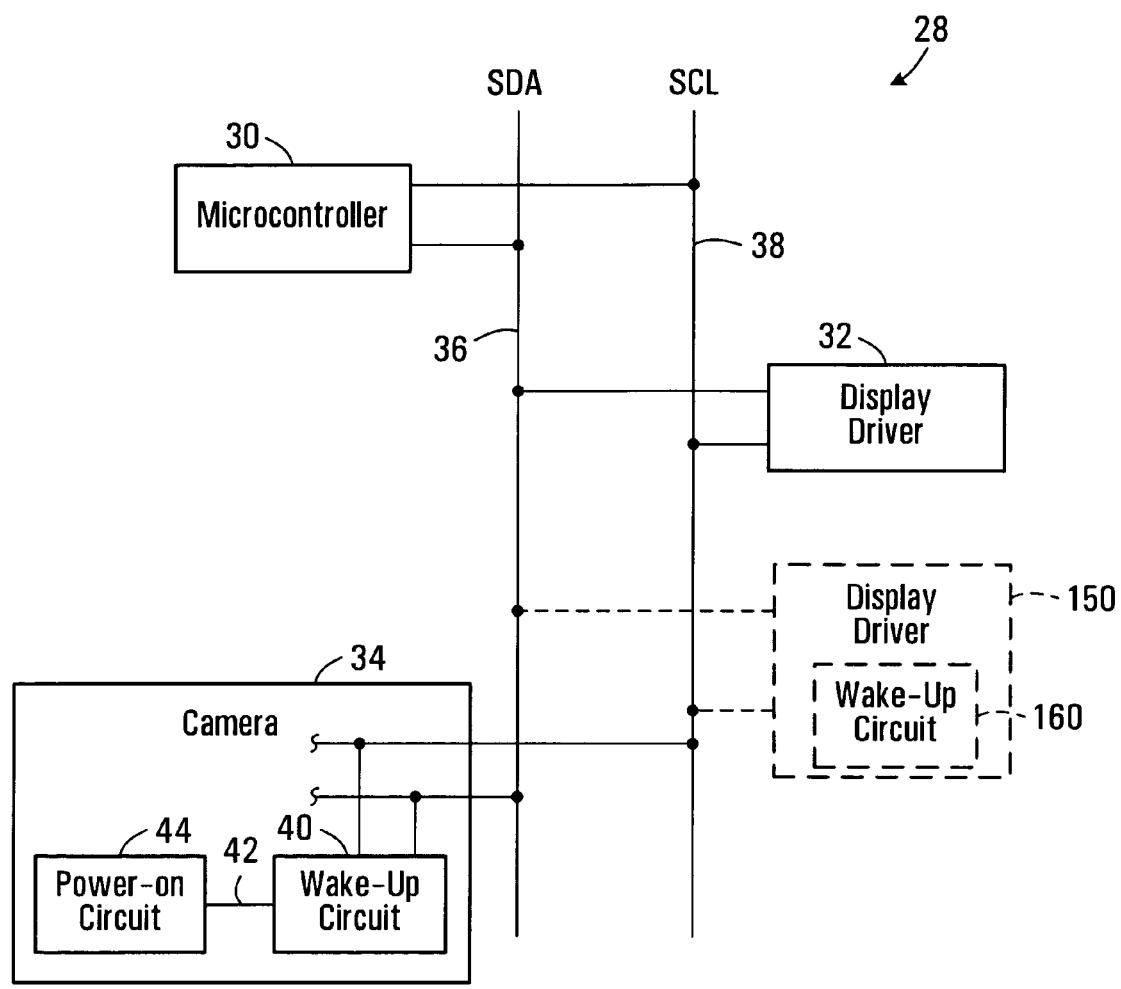
FIG. 2 is a schematic diagram of a multi-device system made in accordance with this invention.

FIG. 2 schematically illustrates an example a multi-device system of a handheld device. Turning to FIG. 2, the handheld device 28 comprises a microcontroller 30, and slave devices, namely, display driver 32 and camera 34 connected by a data bus line 36 and a clock line 38. Camera 34 is provided with a wake-up device 40 for responding to a wake-up sequence from the microcontroller. If the wake-up sequence is recognised by the wake-up device, a high signal will appear on line 42 and be fed to power-on circuit 44 of the camera 34 in order to wake up the camera.

Figure 3:
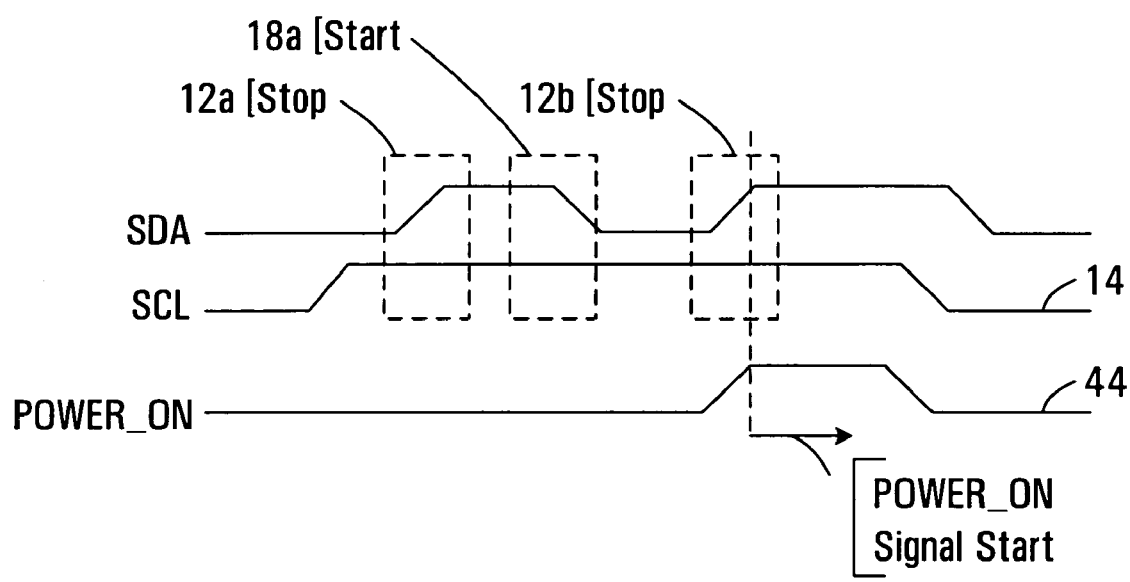
FIG. 3 is a bus signal diagram.

A possible wake-up sequence is a STOP-START-STOP sequence. FIG. 3 shows a signal diagram for this sequence assuming the sequence is generated while the microcontroller holds the clock line high. Turning to FIG. 3, a STOP condition is generated at 12a followed by a START condition at 18a, followed by a further STOP condition at 12b. As shown, a "power-on" signal 44 goes high after the final STOP condition 12b is generated until the clock signal 14 goes to a low state. It will be noted from FIG. 3 that the time between the first STOP condition and the START condition may be shorter than the time between the START condition and the second STOP condition. This may be done to ensure the START condition appears on the bus before the end of the guard time after generation of the first STOP condition.

Figure 4:
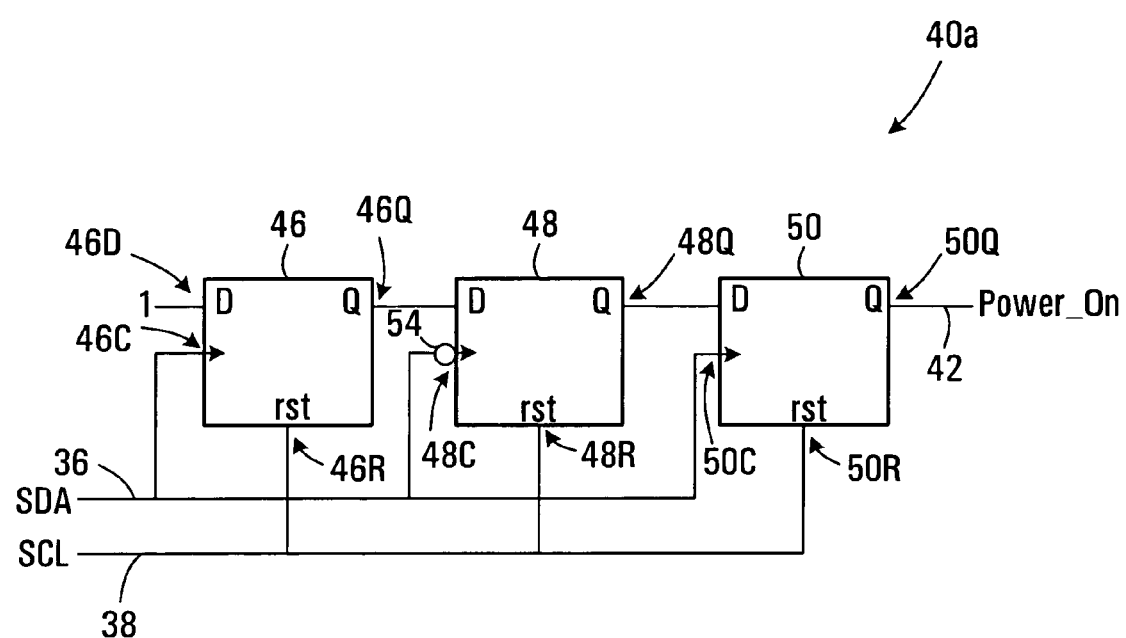
FIG. 4 is a schematic diagram of a wake-up device.

A suitable wake-up device which will recognise a STOP-START-STOP sequence is illustrated in FIG. 4. Turning to FIG. 4, wake-up circuit 40a comprises three serially arranged D-type flip flops, 46, 48, and 50. The reset (i.e., clear) inputs 46R, 48R, 50R of the flip flops 46, 48, 50, respectively, are input by the clock bus 38. A high state (logical 1) is permanently applied to the D-input 46D of flip flop 46. The clock inputs 46C and 50C of flip flops 46 and 50 are input by the data bus 36 and the clock input 48C of flip flop 48 is input by the data bus 36 through an inverter 54. With the clock line 38 low, all of the flip flops are held in a cleared state such that the Q output 46Q, 48Q, 50Q of each flip flop is at a low, or 0, state. After the clock line goes high, when the data line goes high to generate the first STOP condition, the Q output 46Q of flip flop 46 flips to a high state, but the Q outputs of the remaining two flip flops remain at a low state. When the data line then transitions to a low state to generate a START condition, the Q output 48Q of flip flop 48 goes high, but the Q output 50Q of flip flop 50 remains low. When the data line again goes high to generate the second STOP condition, the Q output 50Q of flip flop 50 flips to a high state resulting in a high, or power-on, signal on line 42. This power-on signal will persist until the clock line goes low, when the flip flops are cleared.

Of course alternate wake-up devices are possible. For example, the D-type flip flops may be replaced by any other latching element. Alternatively, a microprocessor could be programmed to recognise the wake-up sequence.

Further, a wake-up device in accordance with this invention can be associated with many other types of slaves in a multi-device system, such as an audio player, a video player, a video codec, a video recorder, a keyboard, a memory, or a graphics processor unit.

The STOP-START-STOP sequence is an indication that the bus is free, followed by an indication the bus is busy, followed by an indication the bus is free. The net effect is to not change the state of the bus. Further, the sequence does not result in any data transfer on the bus. Therefore, the sequence does not negatively impact the operation of any of the devices on the shared bus.

Other wake-up sequences could of course be used provided a suitable wake-up circuit were provided which would recognise the sequence. For example, a START-STOP-START-STOP sequence could be used. Or even a START-STOP sequence. A START-STOP-START sequence could also be used. However, any sequence ending with a START condition will keep the bus in a busy state after the end of the wake-up sequence. This is not problematic if the microcontroller is the only possible master device, but may cause difficulties otherwise. Therefore, in a multi-master system, it is better that the sequence end with a STOP condition.

Further, rather than having a universal wake-up sequence which is recognised by each wake-up circuit in a multi-device system, different wake-up sequences could be used to wake-up different devices provided appropriate wake-up circuits were provided to recognise each of the different wake-up sequences. For example, with reference to FIG. 2, wake-up circuit 40 associated with camera 34 of handheld 28 could be a first wake-up device in order to wake-up the camera on recognising a first wake-up sequence whereas a second wake-up circuit, illustrated in ghost at 160, could be associated with a device driver 150 of the handheld in order to wake up the device driver on recognising a second wake-up sequence which is different from the first sequence.

While the foregoing has been described in conjunction with the I²C bus system, it will be apparent that the teachings of the invention would also be applicable to a shared serial bus according to another specification. The only requirements are that the specification provide for signaling on the shared bus which indicates the bus is busy and signaling which indicates the bus is free and, for multi-master devices, this signaling is arranged so that the bus cannot be seized by a device after the first "free" signal and before the ensuing "busy" signal.

Other modifications will be apparent to those skilled in the art and, therefore, the invention is defined in the claims.

What is claimed is:

1. A method of operating a shared bus having a clock line and a separate data line, comprising:
   sending a wake-up signal on said shared bus comprising a sequence of signals, each signal of said sequence being one of a signal indicating said bus is free and a signal indicating said bus is busy, wherein at least one of said sequence of signals is a signal indicating said bus is free; and
   to send a signal indicating said bus is free, transitioning said data line from a low state to a high state when said clock line is in a high state.

2. The method of claim 1 wherein said wake-up signal comprises a first signal indicating said bus is busy followed by a second signal indicating said bus is free.

3. The method of claim 1 wherein said wake-up signal comprises a first signal indicating said bus is free, followed by a second signal indicating said bus is busy, followed by a third signal indicating said bus is free.

4. The method of claim 2 wherein each signal of said sequence of signals is sent without intervening signals which are not part of said sequence.

5. The method of claim 1 wherein said shared bus is considered busy for a guard time after generation of any signal indicating said bus is free.

6. The method of claim 3 wherein said shared bus is considered busy for a guard time after generation of any signal indicating said bus is free and wherein said second signal is sent during said guard time after said first signal is sent.

7. The method of claim 1 further comprising:
   to send a signal indicating said bus is busy, transitioning said data line from a high state to a low state when said clock line is in a high state.

8. The method of claim 7 wherein said wake-up signal is sent while said clock line is in a high state.

9. The method of claim 7 further comprising:
   to send a data bit, transitioning said data line to a high or to a low data line state while said clock line is in a low state and maintaining said data line at said data line state while said clock line is in a high state.

10. The method of claim 1 wherein said wake-up signal is a first wake-up signal comprising a first sequence of signals and further comprising sending a second wake-up signal comprising a second sequence of signals, each signal of said second sequence being one or a signal indicating said bus is free and a signal indicating said has is busy; said second sequence being a different sequence than said first sequence.

11. A device for a shared bus having a clock line and a separate data line which, when connected to said shared bus is operable to:
   send a wake-up signal on said shared bus comprising a time sequence of signals, each signal of said sequence being one of a signal indicating said bus is free and a signal indicating said bus is busy, at least one signal of said sequence being a signal indicating said bus is free; and
   transition said data line from a low state to a high state when said dock line is in a high state in order to send a signal indicating said bus is free.

12. The device of claim 11 wherein said wake-up signal comprises a first signal indicating said bus is busy followed by a second signal indicating said bus is free.

13. The device of claim 11 wherein said wake-up signal comprises a first signal indicating said bus is free, followed by a second signal indicating said bus is busy, followed by a third signal indicating said bus is free.

14. The device of claim 12 wherein each signal of said sequence of signals is sent without intervening signals which are not part of said sequence.

15. The device of claim 11 wherein said shared bus is considered busy for a guard time after generation of any signal indicating said bus is free.

16. The device of claim 13 wherein said shared bus is considered busy for a guard time after generation of any signal indicating said bus is free and wherein said second signal is sent during said guard time after said first signal is sent.

17. The device of claim 11 further operable to transition said data line from a high state to a low state when said clock line is in a high state in order to send a signal indicating said bus is busy.

18. The device of claim 17 further operable to send said wake-up signal while said clock line is in a high state.

19. The device of claim 18 further operable to:
   transition said data line to a high or to a low data line state while said clock line is in a low state and maintaining said data line at said data line state while said clock line is a high state in order to send a data bit.

20. The device of claim 11 wherein said wake-up signal is a first wake-up signal comprising a first sequence of signals and wherein said device is further operable to send a second wake-up signal comprising a second sequence of signals, each signal of said second sequence being one of a signal indicating said bus is free and a signal indicating said bus is busy; said second sequence being a different sequence than said first sequence.

21. A method of operating a device on a shared bus having a clock line and a separate data line, comprising:
   receiving a wake-up signal on said shared bus comprising a sequence of signals, each signal of said sequence being one of a signal indicating said bus is free and a signal indicating said bus is busy, wherein at least one signal of said sequence being a signal indicating said bus is free;
   to send a signal indicating said bus is free, transitioning said data line from a low state to a high state when said clock line is in a high state; and
   responsive to said receiving, prompting an associated device to power up to a stand-by condition.

22. The method of claim 21 wherein said wake-up signal comprises a first signal indicating said bus is busy followed by a second signal indicating said bus is free.

23. The method of claim 21 wherein said wake-up signal comprises a first signal indicating said bus is free, followed by a second signal indicating said bus is busy, followed by a third signal indicating said bus is free.

24. A method of waking up a slave device, comprising:
while in a power conservation state, receiving a wake-up signal on said shared bus having a clock line and a separate data line, said wake-up signal comprising a sequence of signals, each signal of said sequence being one of a signal indicating said bus is free;
to send a signal indicating said bus is free, transitioning said data line from a low state to a high state when said clock line is in a high state; and
responsive to said receiving, powering up the slave device to a stand-by state.

25. The method of claim 24 wherein said wake-up signal comprises a first signal indicating said bus is busy followed by a second signal indicating said bus is free.

26. The method of claim 24 wherein said wake-up signal comprises a first signal indicating said bus is free, followed by a second signal indicating said bus is busy, Followed by a third signal indicating said bus is free.

27. A device for a shared bus having a clock line and a separate data line which, when connected to said shared bus, is operable to:
receive a wake-up signal on said shared bus comprising a sequence of signals, each signal of said sequence being one of a signal indicating said bus is free and a signal indicating said bus is busy, wherein at least one signal of said sequence being a signal indicating said bus is free;
to send a signal indicating said bus is free, transition said data line from, a low state to a high state when said clock line is in a high state; and
responsive to receiving said wake-up signal, prompt an associated device to power up to a stand-by condition.

28. The device of claim 27 wherein said wake-up signal comprises a first signal indicating said bus is busy followed by a second signal indicating said bus is free.

29. The device of claim 27 wherein said wake-up signal comprises a first signal indicating said bus is free, followed by a second signal indicating said bus is busy, followed by a third signal indicating said bus is free.

30. The device of claim 27 wherein said associated device comprises one of a camera, a displays an audio player, a video player, a video codec, a video recorder, a keyboard, a memory, and a graphics processor unit.

31. A device for a shared bus, which when connected to said shared bus, is operable to:
enter a power conservation state;
while in said power conservation state, receive a wake-up signal on said shared bus comprising a sequence of signals, each signal of said sequence being one of a signal indicating said bus is free and a signal indicating said bus is busy, at least one signal of said sequence being a signal indicating said bus is free; and
responsive to receiving said wake-up signal, power up to a stand-by state;
said device having a first sub-device for having a first connection to said bus for receiving said wake-up signal and a second sub-device for entering said power conservation state and for having a second connection to said bus in parallel with said first connection, said second sub-device, after powering up to said stand-by state, operable to receive data on said parallel, second connection to said bus.

32. The device of claim 31 wherein said wake-up signal comprises a first signal indicating said bus is busy followed by a second signal indicating said bus is free.

33. The device of claim 31 wherein said wake-up signal comprises a first signal indicating said bus is free, followed by a second signal indicating said bus is busy, followed by a third signal indicating said bus is free.

34. The device of claim 31 wherein said second sub-device is operable to consider a data bit to have been received on said parallel second connection to said bus on sensing a stable data line state while said clock line is in a high state.

35. The device of claim 31 wherein said second sub-device comprises one of a camera, a display, an audio player, a video player, a video codec, a video recorder, a keyboard, a memory, and a graphics processor unit.

36. A multi-device system comprising:
a shared bus;
a first device connected to said shared bus operable to send a wake-up signal on said shared bus comprising a time sequence of signals, each signal of said sequence being on of a signal indicating said bus is free and a signal indicating said bus is busy, wherein at least one signal of said sequence being a signal indicating said bus is free; and
a second device connected to said shared bus operable to enter a power conservation state; while in said power conservation state, receive said wake-up signal on said shared bus; and responsive to receiving said wake-up signal, power up to a stand-by state;
wherein said second device has a first sub-device having a first connection to said bus for receiving said wake-up signal and a second sub-device for entering said power conservation state and having a second connection to said bus in parallel with said first connection, said second sub-device, after powering up to said stand-by state, operable to receive data on said parallel, second connection to said bus.

37. The system of claim 36 wherein said wake-up signal comprises a first signal indicating said bus is busy followed by a second signal indicating said bus is free.

38. The system of claim 36 wherein said wake-up signal comprises a first signal indicating said bus is free, followed by a second signal indicating said bus is busy, followed by a third signal indicating said bus is free.

39. The system of claim 38 wherein said shared bus is considered busy for a guard time after generation of any signal indicating said bus is free and wherein said third signal is received during said guard time after said second signal is received.

40. The system of claim 36 wherein said second sub-device comprises one of a camera, a display, an audio player, a video player, a video codec, a video recorder, a keyboard, a memory, and a graphics processor unit.

41. The system of claim 36 wherein said wake-up signal is a first wake-up signal comprising a first sequence of signals and wherein said first device is further operable to send a second wake-up signal comprising a second sequence of signals, each signal of said second sequence being one of a signal indicating said bus is free and a signal indicating said bus is busy; said second sequence being a different sequence than said first sequence and further comprising a third device connected to said bus operable to enter a power conservation state and, while in said power conservation state, responsive to receiving said second wake-up signal, power up to a stand-by state, said third device further operable to ignore said first wake-up signal.

42. A wake-up device for a shared bus comprising:
- a first D-type flip flop having a clock input input by a data line of said shared bus and a reset input input by a clock line of said shared bus, said first flip flop also having a D input and a Q output; and
- a second D-type flip flop having a clock input that receives said data line through an inverter and a reset input that receives said clock line, said second flip flop also having a D input and a Q output;
- wherein either said Q output of said first flip flop inputs said D input of said second flip flop.

43. The device of claim 42 further comprising a third D-type flip flop having a clock input input by a data line of said shared bus and a reset input input by a clock line of said shared bus, a Q output of said second flip flop inputting said D input of said third flip flop.

44. A wake-up device for a shared bus having a clock line and a separate data line comprising:
- a first latch connected to said clock line and said data line of said shared bus for sensing one of said shared bus being free and said shared bus being busy and outputting a latch signal; and
- a second latch connected to said clock line and said data tine of said shared bus and to an output of said first latch to, after receipt of said latch signal, sense another of said shred bus being free and said shared bus being busy and output a power-on signal.

45. An apparatus for operating a shared bus having a clock line and a separate data line, comprising:
- means for sending a wake-up signal on said shared bus comprising a sequence of signals; each signal of said sequence being one of a signal indicating said bus is free and a signal indicating said bus is busy, wherein at least one of said sequence being a signal indicating said bus is free; and
- to send a signal indicating said bus is free, means for transitioning said data line from a low state to a high state when said clock line is in a high state.

46. The apparatus of claim 45, wherein said wake-up signal comprises a first signal indicating said bus is busy followed by a second signal indicating said bus is free.

47. The apparatus oif claim 46, wherein each signal of said sequence of signals is sent without intervening signals which are not part of said sequence.

48. The apparatus of claim 45, wherein said shared bus is considered busy for a guard time after generation of any signal indicating said bus is free.

49. The apparatus of claim 45, further comprising:
- to send a signal indicating said bus is busy, means for transitioning said data line from a high state to a low state when said clock line is in a high state.

50. The apparatus of claim 49, wherein said wake-up signal is sent while said clock line is in a high state.

51. The apparatus of claim 49, further comprising:
- to send a data bit, means for transitioning said data line to a high or to a low data line state while said clock line is in a low state and maintaining said data line at said data line state while said clock line is a high state.

52. The apparatus of claim 45, wherein said wake-up signal is a first wake-up signal comprising a first sequence of signals and further comprising sending a second wake-up signal comprising a second sequence of signals, each signal of said second sequence being one of a signal indicating said bus is free and a signal indicating said bus is busy; said second sequence being a different sequence than said first sequence.

53. The apparatus of claim 45, wherein said wake-up signal comprises a first signal indicating said bus is free, followed by a second signal indicating said bus is busy, followed by a third signal indicating said bus is free.

54. The apparatus of claim 53 wherein said shared bus is considered busy for a guard time after generation of any signal indicating said bus is free and wherein said second signal is sent during said guard time after said first signal is sent.

* * * * *